F. SCHUBERT.
PRESSURE AND VACUUM GAGE.
APPLICATION FILED APR. 10, 1908.

1,083,902.

Patented Jan. 6, 1914.

WITNESSES
Frank A. Seibert.
Edgar M. Greenbaum.

INVENTOR
Frederick Schubert,
BY
E. F. Gennert
ATTORNEY

UNITED STATES PATENT OFFICE.

FREDERICK SCHUBERT, OF SELLERSVILLE, PENNSYLVANIA.

PRESSURE AND VACUUM GAGE.

1,083,902.  Specification of Letters Patent.  Patented Jan. 6, 1914.

Application filed April 10, 1908. Serial No. 426,248.

*To all whom it may concern:*

Be it known that I, FREDERICK SCHUBERT, a citizen of the United States, and resident of Sellersville, in the county of Bucks and State of Pennsylvania, have invented certain new and useful Improvements in Pressure and Vacuum Gages, of which the following is a specification.

My invention relates to spring pressure or vacuum gages, the object being the production of such a gage by employing an adjustable eccentric whereby a uniform scale can be adopted.

Figure 1:
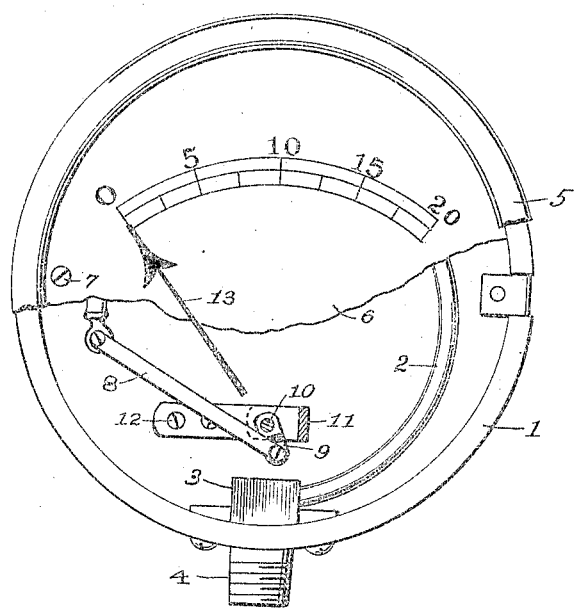
Figures 2, 3, 4, 5:
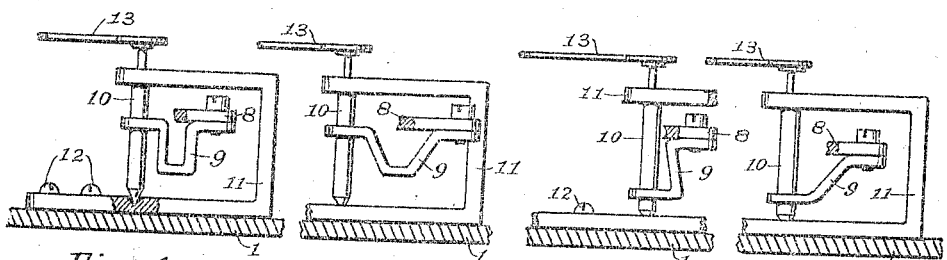

In the accompanying drawings, Figure 1 is a front elevation of my invention, the dial and indicator being broken away for clearness of illustration. Fig. 2 is a side view of my improved adjustable eccentric in a contracted position. Fig. 3 is a similar view with the eccentric extended. Figs. 4 and 5 is a modified eccentric shown respectively contracted and extended.

Similar reference characters refer to like parts in the several views.

The body or case 1 has the usual Bourdon spring 2 mounted on a post 3 having suitable connection 4. The bezel 5 holds glass in place on the case. The dial or scale 6 is held in position by means of screws 7. To the other end of the Bourdon spring 2, one end of a link 8 is pivotally-connected, the other end of said link being pivotally-connected to one end of a lever 9 formed of material having sufficient rigidity for the purpose desired, but which is capable of being bent at a point or points between its ends so as to provide for regulation in the travel of the indicator.

Within the body or case 1 is a supporting frame 11, preferably as shown substantially U-shape, and which can be readily formed from a strap of metal to reduce cost of manufacture. This frame is suitably secured to the body or case 1 as by screws 12 and lies horizontally-disposed above the post 3. In the frame is mounted the pin 10 which carries the indicator 13. The other end of the bendable lever 9 is suitably secured as by solder or otherwise to said pin 10, between the arms of the frame 11. Such being the construction the operation is as follows:—

When all the parts are assembled, the indicator is set at the zero mark, and the gage is tested with a standard gage. To make the indicator travel faster or slower so as to caliber correctly on the scale, the lever 9 is either contracted or extended, that is to say, the free end of the lever to which the link 8 is connected is brought nearer to or farther away from the pin 10, whereby the radius is varied for accomplishing this purpose.

Heretofore, where an eccentric of a fixed radius was used, it was necessary to select a link of the proper length so as to have the indicator at zero, and then to lay out each individual scale to suit the conditions. By using the bendable lever, scales of a uniform, predetermined calibration can be used, and the eccentric adjusted so that the pressure or vacuum is correctly indicated on the dial.

What I claim is—

In a pressure gage, a Bourdon spring, a substantially U-shaped supporting frame, a pin journaled in the arms of said frame and carrying an indicator, a link pivotally connected at one end to the free end of the Bourdon spring, an angularly bent lever fixedly connected at one end to said pin and at its other end pivotally connected to the other end of said link, said bent lever being bendable between its ends in a direction substantially at right angles to the direction of stress of the Bourdon spring for varying the leverage thereof, the strain being across the angular bend of said lever.

Signed at Sellersville in the county of Bucks and State of Pennsylvania this 6th day of April A. D. 1908.

FREDERICK SCHUBERT.

Witnesses:
NOBLE HARTZELL,
HENRY T. WILLIAMS.